US012584632B2

(12) United States Patent    (10) Patent No.:   US 12,584,632 B2
Binek et al.    (45) Date of Patent:   Mar. 24, 2026

(54) MODULAR INJECTOR BOLT FOR AN ENGINE

(71) Applicant: RTX Corporation, Farmington, CT (US)

(72) Inventors: Lawrence A. Binek, Glastonbury, CT (US); Jose R. Paulino, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/384,659

(22) Filed: Oct. 27, 2023

(65)       Prior Publication Data

US 2025/0137643 A1    May 1, 2025

(51) Int. Cl.
| | |
|---|---|
| *F23R 3/28* | (2006.01) |
| *F02K 9/52* | (2006.01) |
| *F02M 61/18* | (2006.01) |
| *F23D 7/00* | (2006.01) |
| *F23R 3/14* | (2006.01) |
| *F23R 3/30* | (2006.01) |
| *F23R 3/32* | (2006.01) |
| *F23R 3/38* | (2006.01) |

(52) U.S. Cl.
CPC ................ *F23R 3/286* (2013.01); *F02K 9/52* (2013.01); *F02M 61/18* (2013.01); *F23D 7/00* (2013.01); *F23R 3/14* (2013.01); *F23R 3/30* (2013.01); *F23R 3/32* (2013.01); *F23R 3/38* (2013.01)

(58) Field of Classification Search
CPC ...... F23R 3/30; F23R 3/32; F23R 3/38; F23R 3/286; F02K 9/52; F02C 7/22; F02M 61/18; F23D 7/00
See application file for complete search history.

(56)       References Cited

U.S. PATENT DOCUMENTS

| | | |
|---|---|---|
| 3,295,325 A | 1/1967 | Nelson, Jr. |
| 3,703,259 A | 11/1972 | Sturgess |
| 3,719,042 A | 3/1973 | Chamberlain |

(Continued)

FOREIGN PATENT DOCUMENTS

| | | |
|---|---|---|
| EP | 3249301 A1 | 11/2017 |
| EP | 2639508 B1 | 5/2020 |

(Continued)

OTHER PUBLICATIONS

EP Search Report for EP Patent Application No. 24208794.8 dated Feb. 3, 2025.

(Continued)

*Primary Examiner* — Kyle Robert Thomas

(74) *Attorney, Agent, or Firm* — Getz Balich LLC

(57)       ABSTRACT

An assembly is provided for an engine. This engine assembly includes an engine structure and a fuel injector. The engine structure includes an injector receptacle and a fuel supply passage. The injector receptacle extends longitudinally through the engine structure along a centerline. The fuel supply passage extends laterally within the engine structure to the injector receptacle. The fuel injector is mated with the injector receptacle. The fuel injector includes a nozzle passage and a nozzle outlet. The nozzle passage spirals about the centerline within the fuel injector towards the nozzle outlet. The nozzle passage fluidly couples the nozzle outlet to the fuel supply passage.

18 Claims, 10 Drawing Sheets

(56)                   References Cited

U.S. PATENT DOCUMENTS

| | | | | |
|---|---|---|---|---|
| 3,788,067 | A * | 1/1974 | Carlisle | F23D 17/002 |
| | | | | 60/742 |
| 3,853,273 | A | 12/1974 | Bahr | |
| 3,991,559 | A | 11/1976 | Oda | |
| 4,028,888 | A | 6/1977 | Pilarczyk | |
| 4,057,371 | A | 11/1977 | Pilarczyk | |
| 4,398,388 | A | 8/1983 | Langston, Jr. | |
| 4,898,329 | A | 2/1990 | Davis | |
| 4,967,562 | A | 11/1990 | Shekleton | |
| 5,140,807 | A | 8/1992 | Shekleton | |
| 6,253,555 | B1 | 7/2001 | Willis | |
| 6,931,862 | B2 | 8/2005 | Harris | |
| 8,387,391 | B2 * | 3/2013 | Patel | F23R 3/28 |
| | | | | 60/740 |
| 9,062,609 | B2 | 6/2015 | Mehring | |
| 9,400,104 | B2 * | 7/2016 | Low | F23D 11/383 |
| 9,803,498 | B2 | 10/2017 | Jewess | |
| 10,060,628 | B2 | 8/2018 | Johnson | |
| 10,816,207 | B2 * | 10/2020 | Fryer | F23R 3/283 |
| 11,053,854 | B1 | 7/2021 | Mcintyre, II | |
| 2010/0071377 | A1 | 3/2010 | Fox | |
| 2010/0229557 | A1 | 9/2010 | Matsumoto | |
| 2013/0031908 | A1 | 2/2013 | Dicintio | |
| 2013/0104553 | A1 | 5/2013 | Stoia | |
| 2013/0174559 | A1 | 7/2013 | Mehring | |
| 2013/0239575 | A1 | 9/2013 | Chen | |
| 2013/0283807 | A1 | 10/2013 | Stoia | |
| 2014/0190170 | A1 | 7/2014 | Cai | |
| 2014/0196465 | A1 | 7/2014 | Laster | |
| 2014/0352312 | A1 | 12/2014 | Beck | |
| 2014/0367494 | A1 * | 12/2014 | Donovan | F23R 3/28 |
| | | | | 239/408 |
| 2015/0253010 | A1 * | 9/2015 | Schlein | F23D 17/002 |
| | | | | 60/776 |
| 2015/0285504 | A1 | 10/2015 | Melton | |
| 2015/0362194 | A1 | 12/2015 | Ogata | |
| 2016/0209041 | A1 | 7/2016 | Twelves, Jr. | |
| 2017/0038074 | A1 * | 2/2017 | Myers | F23R 3/343 |
| 2017/0211480 | A1 * | 7/2017 | Myers | B05B 1/02 |
| 2018/0058226 | A1 | 3/2018 | Tucker | |
| 2018/0304281 | A1 | 10/2018 | Wirtz | |
| 2019/0301738 | A1 * | 10/2019 | North | F23R 3/286 |
| 2020/0049349 | A1 | 2/2020 | Amble | |
| 2020/0332719 | A1 | 10/2020 | Binek | |
| 2020/0398386 | A1 | 12/2020 | Binek | |
| 2020/0400314 | A1 | 12/2020 | Binek | |
| 2022/0170636 | A1 | 6/2022 | Binek | |
| 2022/0307694 | A1 | 9/2022 | Binek | |
| 2023/0266008 | A1 | 8/2023 | Binek | |

FOREIGN PATENT DOCUMENTS

| | | | |
|---|---|---|---|
| JP | S5045121 | A | 4/1975 |
| JP | 2004340208 | A | 12/2004 |

OTHER PUBLICATIONS

EP Search Report for EP Patent Application No. 24208794.8 dated Apr. 16, 2025.

* cited by examiner

MODULAR INJECTOR BOLT FOR AN ENGINE

BACKGROUND OF THE DISCLOSURE

1. Technical Field

This disclosure relates generally to fuel delivery and, more particularly, to a fuel injector for an engine.

2. Background Information

A typical gas turbine engine includes an array of fuel injectors. The fuel injectors are operable to inject fuel into a chamber of a combustor for combustion. The fuel injectors are located radially within an engine casing. Each fuel injector may be L-shaped with a radially extending support arm and an axially extending nozzle at an inner end of the support arm. The support arm is secured to the engine casing and the nozzle is mated with a respective opening in a bulkhead of the combustor. While such known fuel injectors have various benefits, these fuel injectors may be cumbersome to install and may require significant engine disassembly for fuel injector inspection, maintenance and/or replacement.

It is also known in the art to form a fuel injector with a surrounding engine casing as a unitary body. While such an integral fuel injector configuration may simplify engine assembly, the fuel injector cannot be replaced without also replacing or modifying the engine casing.

Thus, there is a need in the art for an improved fuel injector system.

SUMMARY OF THE DISCLOSURE

According to an aspect of the present disclosure, an assembly is provided for an engine. This engine assembly includes an engine structure and a fuel injector. The engine structure includes an injector receptacle and a fuel supply passage. The injector receptacle extends longitudinally through the engine structure along a centerline. The fuel supply passage extends laterally within the engine structure to the injector receptacle. The fuel injector is mated with the injector receptacle. The fuel injector includes a nozzle passage and a nozzle outlet. The nozzle passage spirals about the centerline within the fuel injector towards the nozzle outlet. The nozzle passage fluidly couples the nozzle outlet to the fuel supply passage.

According to another aspect of the present disclosure, another assembly is provided for an engine. This engine assembly includes an engine structure and a fuel injector. The engine structure includes an injector receptacle and a fuel supply passage. The injector receptacle extends longitudinally through the engine structure along a centerline. The fuel supply passage extends laterally within the engine structure to the injector receptacle. The fuel injector is mated with the injector receptacle and is attached to the engine structure by a threaded interface. The fuel injector is configured as a monolithic body and includes a fuel nozzle and a splash plate. The splash plate includes a frustoconical splash plate surface. The fuel injector is configured to direct fuel, received by the nozzle passage from the fuel supply passage, out of the fuel nozzle to impinge against the frustoconical splash plate surface.

According to still another aspect of the present disclosure, another assembly is provided for an engine. This engine assembly includes an engine structure and a fuel injector.

The engine structure includes an injector receptacle, a fuel supply passage and a combustion chamber. The injector receptacle extends longitudinally through the engine structure along a longitudinal centerline to the combustion chamber. The fuel supply passage extends laterally within the engine structure to the injector receptacle. The longitudinal centerline is parallel with or angularly offset from a centerline axis of the engine structure by less than fifteen degrees. The fuel injector is mated with the injector receptacle and is attached to the engine structure by a threaded interface. The fuel injector includes a nozzle passage and a nozzle outlet. The nozzle passage extends longitudinally along the centerline within the fuel injector towards the nozzle outlet. The nozzle passage fluidly couples the nozzle outlet to the fuel supply passage.

The nozzle passage may be configured as or otherwise include a spiral nozzle passage.

The fuel nozzle may include an annular nozzle outlet and a plurality of spiral nozzle passages fluidly coupled in parallel between the annular nozzle outlet and the fuel supply passage.

The nozzle passage may spiral about the centerline within the fuel injector to the nozzle outlet.

The nozzle passage may spiral two or more rotations about the centerline within the fuel injector.

The nozzle passage may have a spiral diameter and a spiral pitch that is equal to or greater than the spiral diameter.

The nozzle passage may have a spiral diameter and a spiral pitch that is less than the spiral diameter.

The nozzle passage may be a first nozzle passage, and the fuel injector may also include a second nozzle passage longitudinally overlapping the first nozzle passage. The second nozzle passage may spiral about the centerline within the fuel injector towards the nozzle outlet. The second nozzle passage may fluidly couple the nozzle outlet to the fuel supply passage.

The fuel injector may also include a fuel nozzle and a splash plate. The fuel nozzle may include the nozzle passage and the nozzle outlet. The fuel injector may be configured to direct fuel, received by the nozzle passage from the fuel supply passage, out of the fuel nozzle through the nozzle outlet to impinge against the splash plate.

The splash plate may include a frustoconical splash plate surface. The fuel injector may be configured to direct fuel out of the fuel nozzle through the nozzle outlet to impinge against the frustoconical splash plate surface.

The injector receptacle may extend longitudinally through the engine structure along the centerline to an interior surface of the engine structure. The interior surface may be angularly offset from the centerline by a first angle. The frustoconical splash plate surface may be angularly offset from the centerline by a second angle that is equal to or less than the first angle.

The nozzle outlet may be formed by a frustoconical nozzle surface that is longitudinally spaced from and parallel with the frustoconical splash plate surface.

The fuel injector may also include a fuel nozzle and a splash plate. The fuel nozzle may include the nozzle passage and the nozzle outlet. The splash plate may be disposed at a distal end of the fuel nozzle and laterally overlaps the nozzle outlet.

The fuel injector may also include a fuel coupler disposed within the fuel injector receptacle adjacent the fuel supply passage. The fuel coupler may fluidly couple the fuel supply passage to the nozzle passage.

The fuel coupler may include a tubular sidewall and a chamber within the tubular sidewall. A port may extend laterally through the tubular sidewall. The port may be at least partially aligned with an orifice to the fuel supply passage. The chamber may be fluidly coupled with and between the port and the nozzle passage.

The fuel injector may be attached to the engine structure by a threaded interface.

The fuel injector may be configured to be installed with or removed from the engine structure completely from an exterior of the engine structure.

The fuel injector may include a base and a head connected to the base. The base may project longitudinally along the centerline into the injector receptacle. The head may be abutted longitudinally against a surface of the engine structure.

The engine may be configured as or otherwise include a gas turbine engine. The engine structure may be configured as or otherwise include a wall of a combustor of the gas turbine engine.

The centerline may be parallel with or angularly offset from a centerline axis of the combustor by less than fifteen degrees.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
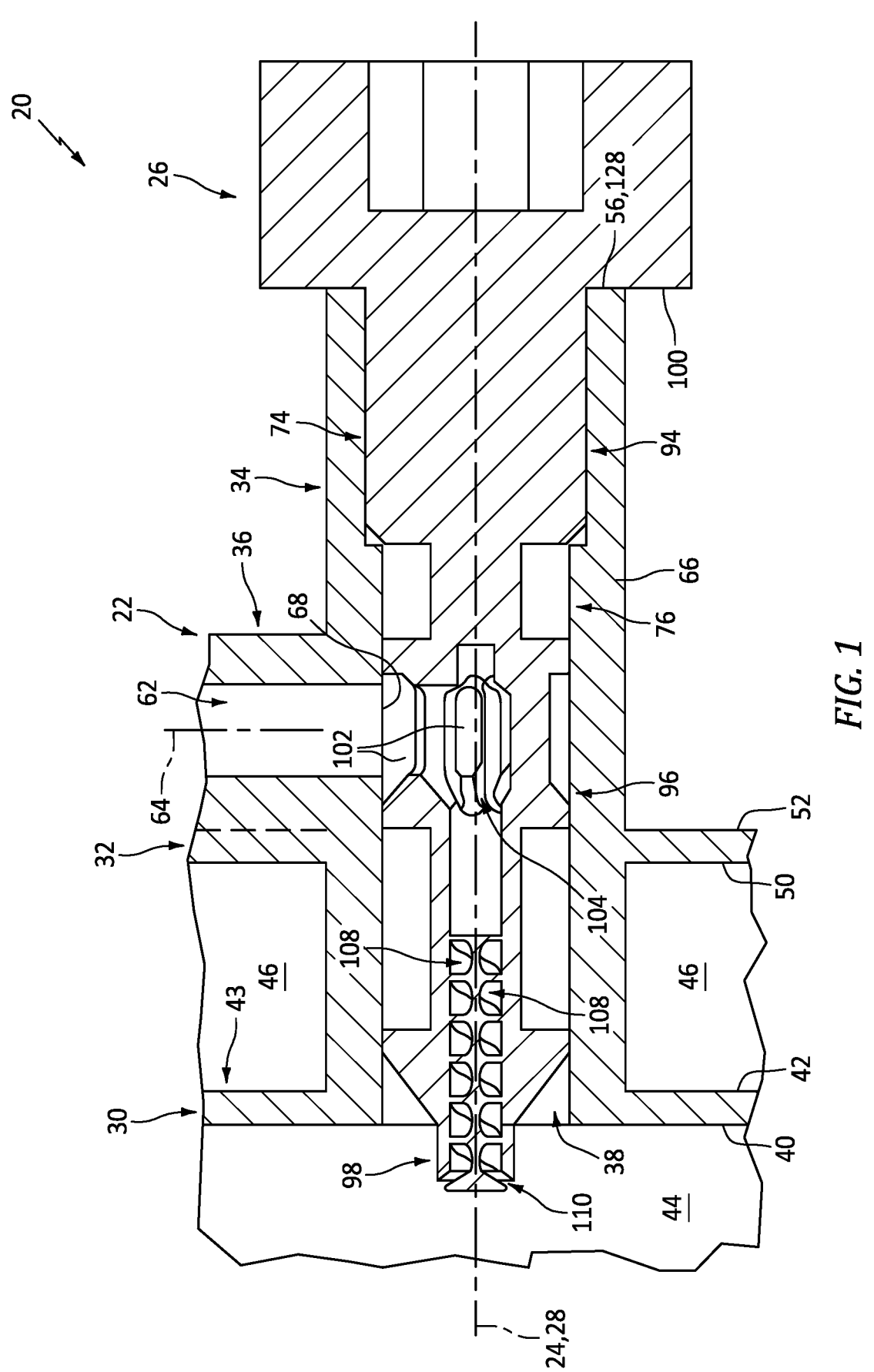
FIG. 1 is a plan view sectional illustration of a portion of an assembly for an internal combustion engine.
Figure 2:
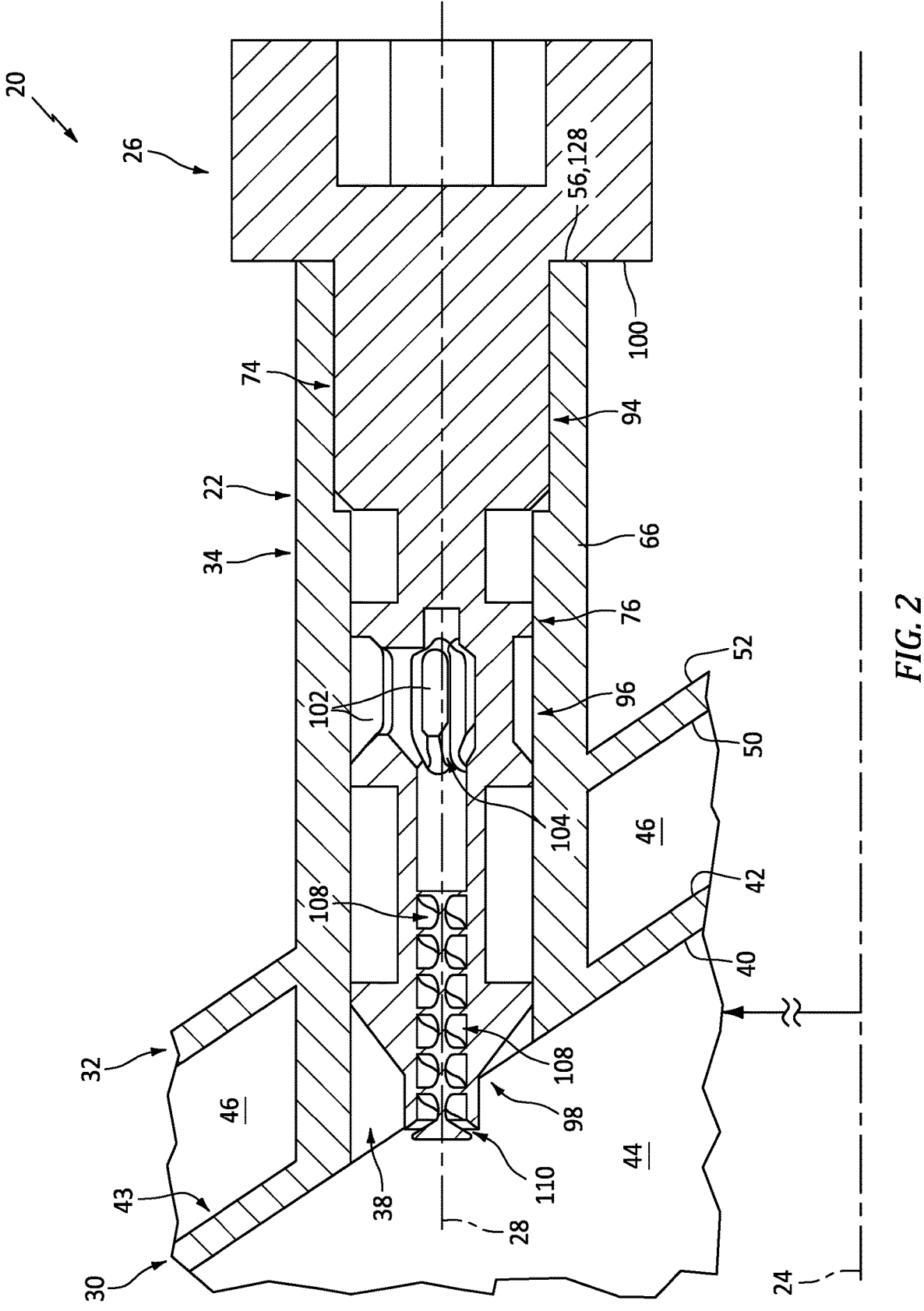
FIG. 2 is another sectional illustration of a portion of the engine assembly.

FIGS. 1 and 2 are sectional illustrations of an assembly 20 for an internal combustion (IC) engine. For ease of description, this engine is described below as a gas turbine engine for an aircraft. The gas turbine engine may be a turbojet engine, a turbofan engine, a turboprop engine, a turboshaft engine, a propfan engine, a pusher fan engine or an auxiliary power unit (APU). The aircraft may be an airplane, a helicopter, a drone (e.g., an unmanned aerial vehicle (UAV)) or any other manned or unmanned aerial vehicle or system. The present disclosure, however, is not limited to such exemplary engines nor to aircraft applications. The engine, for example, may alternatively be an industrial turbine engine, a reciprocating piston engine, a rotary engine (e.g., a Wenkel engine), or any other type of engine where fuel is continuously or periodically injected into a combustion volume for combustion.

The engine assembly 20 of FIGS. 1 and 2 includes a stationary engine structure 22 with a centerline axis 24. This engine assembly 20 also includes a removable/modular fuel injector 26 with a longitudinal centerline 28.

Figure 3:
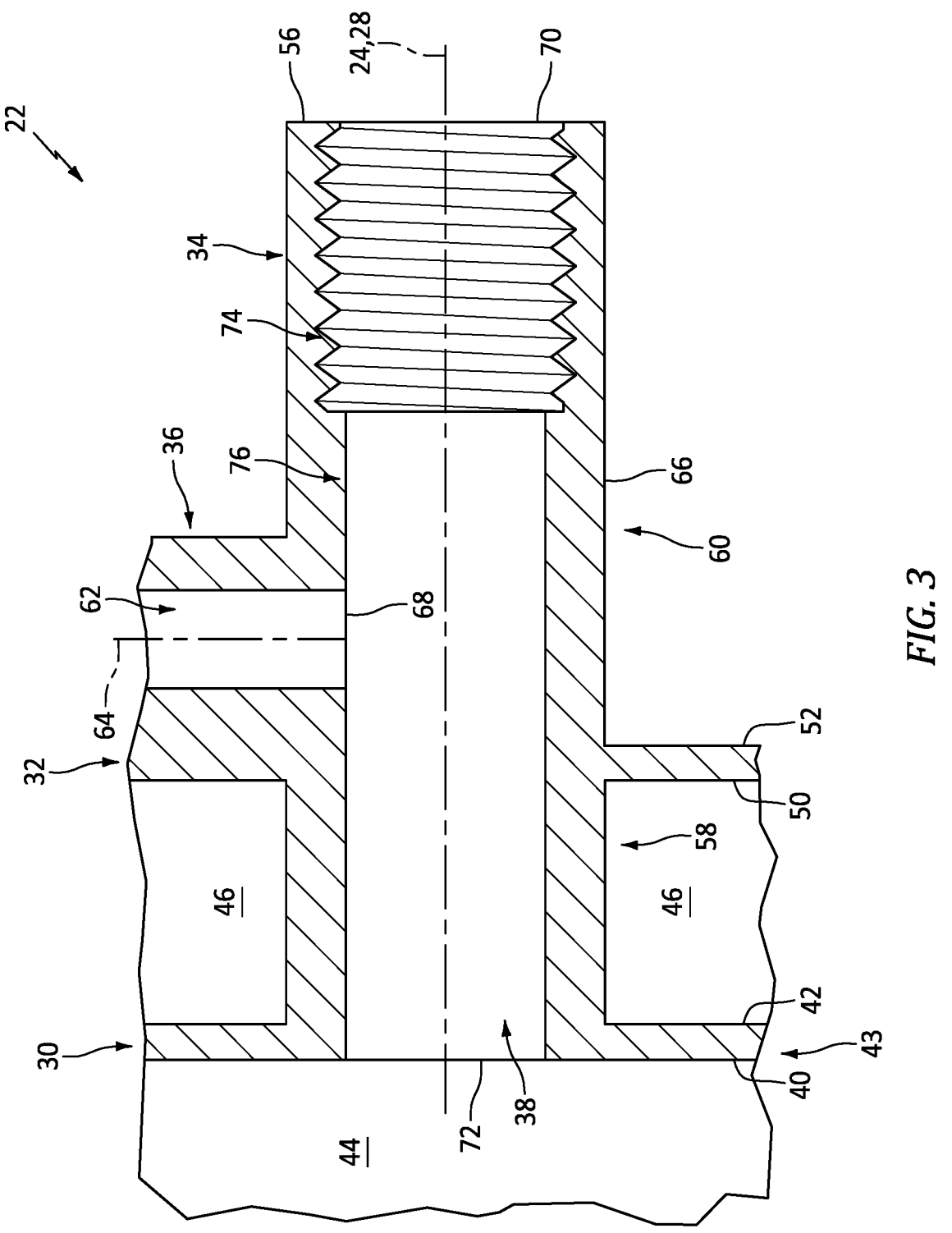
FIG. 3 is a plan view sectional illustration of a portion of an engine structure for the engine assembly.

The engine structure 22 of FIG. 3 extends circumferentially about (e.g., partially or completely around) the centerline axis 24. The engine structure 22 of FIG. 4 extends axially along the centerline axis 24. The engine structure 22 of FIGS. 3 and 4 includes an inner wall 30, an outer wall 32, a fuel injector mount 34, a fuel conduit 36 (see FIG. 3) and a fuel injector receptacle 38.

The inner wall 30 may be configured as a wall of a combustor 43 (see also FIG. 11) within the engine such as a combustor bulkhead wall or a combustor liner wall. The inner wall 30 of FIGS. 3 and 4, for example, has a thickness which extends from an inner surface 40 of the inner wall 30 to an outer surface 42 of the inner wall 30. The inner wall inner surface 40 forms a peripheral outer boundary of a combustion chamber 44 (or another combustion volume) within the engine combustor 43. The inner wall outer surface 42 forms a peripheral inner boundary of a diffuser plenum 46 (or another cavity or flowpath) between the inner wall 30 and the outer wall 32 and adjacent (e.g., surrounding) the engine combustor 43. The inner wall 30 extends circumferentially about (e.g., partially or completely around) the centerline axis 24. The inner wall 30 may also extend radially away from and/or axially along the centerline axis 24. The inner wall 30 of FIG. 4, for example, converges radially inward towards the centerline axis 24 as the inner wall 30 extends axially along the centerline axis 24. With this arrangement, the inner wall 30 and its inner wall inner surface 40 are angularly offset from the centerline axis 24 by an included angle 48 when viewed, for example, in a first reference plane parallel with (e.g., including) the centerline axis 24 and/or the longitudinal centerline 28; e.g., plane of FIG. 4. This inner wall angle 48 may be a non-zero acute angle such as between thirty degrees (30°) and eighty degrees (80°); e.g., forty-five degrees (45°), sixty degrees (60°), etc. Alternatively, the inner wall angle 48 may be a right angle where the inner wall 30 and its inner wall inner surface 40 are perpendicular to the centerline axis 24. Still alternatively, it is contemplated the inner wall angle 48 may be a zero angle where the inner wall 30 and its inner wall inner surface 40 are parallel with the centerline axis 24.

Figure 4:
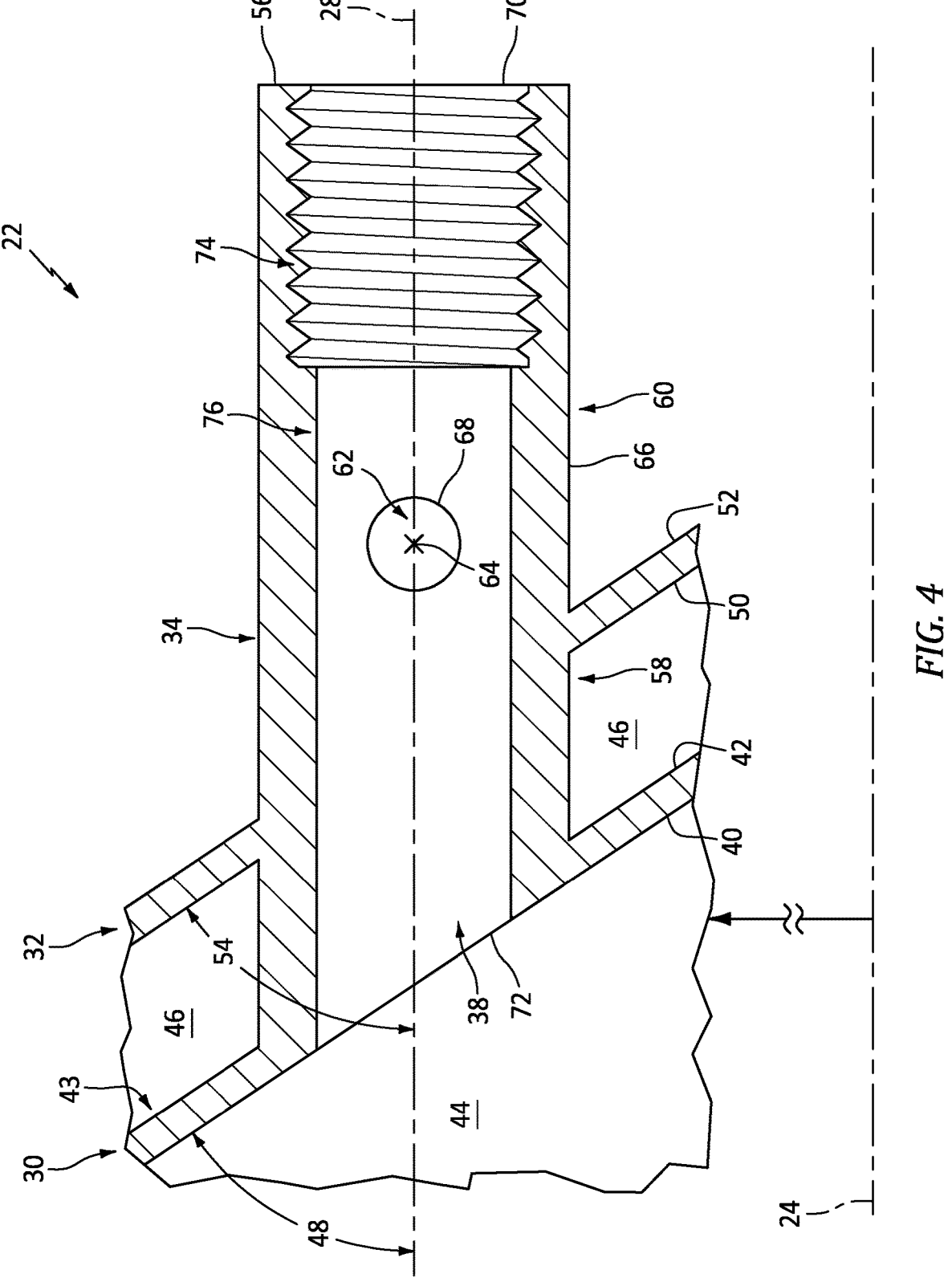
FIG. 4 is another section illustration of a portion of the engine structure.

The outer wall 32 may be configured as a diffuser case (or another combustor section case). The outer wall 32 of FIGS. 3 and 4, for example, has a thickness which extends from an inner surface 50 of the outer wall 32 to an outer surface 52 of the outer wall 32. The outer wall inner surface 50 forms a peripheral outer boundary of the diffuser plenum 46. The outer wall outer surface 52 forms an exterior surface of the engine. The outer wall 32 extends circumferentially about (e.g., partially or completely around) the centerline axis 24. The outer wall 32 may also extend radially away from and/or axially along the centerline axis 24. The outer wall 32 of FIG. 4, for example, converges radially inward towards the centerline axis 24 as the outer wall 32 extends axially along the centerline axis 24. With this arrangement, the outer wall 32 and its outer wall inner surface 50 are angularly offset from the centerline axis 24 by an included angle 54 when viewed, for example, in the first reference plane. This outer wall angle 54 of FIG. 4 is equal to the inner wall angle 48.

However, in other embodiments, the outer wall angle 54 may be (e.g., slightly) greater or less than the inner wall angle 48.

Referring to FIGS. 1 and 2, the injector mount 34 is configured for mounting the fuel injector 26 to the engine structure 22. The injector mount 34 of FIGS. 1 and 2, for example, is a tubular member of the engine structure 22 (e.g., a boss) configured to receive the fuel injector 26. Referring to FIGS. 3 and 4, the injector mount 34 projects longitudinally along the longitudinal centerline 28 out from the inner wall 30, through the outer wall 32, to a longitudinal distal end 56 of the injector mount 34. This injector mount 34 is connected to (e.g., formed integral with or otherwise attached to) the inner wall 30 and/or the outer wall 32. The injector mount 34 of FIGS. 3 and 4 extends circumferentially about (e.g., completely around) the longitudinal centerline 28, providing the injector mount 34 with a full-hoop (e.g., tubular) geometry. With this arrangement, a tubular inner portion 58 of the injector mount 34 extends longitudinally across the diffuser plenum 46 from the outer wall 32 and its outer wall inner surface 50 to the inner wall 30 and its inner wall outer surface 42. A tubular outer portion 60 of the injector mount 34 projects longitudinally out from the outer wall 32 and its outer wall outer surface 52 to the mount distal end 56.

Referring to FIG. 3, the fuel conduit 36 is configured as or may otherwise be part of a fuel supply circuit for the fuel injector 26. The fuel conduit 36, for example, may be or may be part of a fuel supply tube, a fuel inlet manifold and/or a fuel distribution manifold. The fuel conduit 36 of FIG. 3 is connected to (e.g., formed integral with or otherwise attached to) the outer wall 32 and is arranged at the outer wall outer surface 52. The fuel conduit 36 extends circumferentially along the outer wall 32 to the injector mount 34 and its mount outer portion 60. With this arrangement, a fuel supply passage 62 extends along a centerline 64 of the fuel supply passage 62 (e.g., laterally relative to the longitudinal centerline 28), through the fuel conduit 36 and a tubular sidewall 66 of the injector mount 34 and its mount outer portion 60, to a supply passage orifice 68. The supply passage orifice 68 of FIGS. 3 and 4 is configured as an outlet from the fuel supply passage 62 into the injector receptacle 38.

The injector receptacle 38 is configured as an internal aperture (e.g., a bore) in the engine structure 22. The injector receptacle 38 extends longitudinally along the longitudinal centerline 28 through the engine structure 22 to and between an outer end 70 of the injector receptacle 38 and an inner end 72 of the injector receptacle 38, which receptacle inner end 72 is longitudinally opposite the receptacle outer end 70. The receptacle outer end 70 is arranged at the mount distal end 56. The receptacle inner end 72 is arranged at the inner wall inner surface 40. The injector receptacle 38 of FIGS. 3 and 4 thereby extends longitudinally along the longitudinal centerline 28 from the mount distal end 56, sequentially through (and may be formed by) the mount outer portion 60, the outer wall 32, the mount inner portion 58 and the inner wall 30, to the inner wall inner surface 40.

The injector receptacle 38 of FIGS. 3 and 4 includes a threaded portion 74 and a non-threaded portion 76. The receptacle threaded portion 74 is a tapped portion of the mount sidewall 66 forming the injector receptacle 38. The receptacle threaded portion 74 is disposed at (e.g., on, adjacent or proximate) the receptacle outer end 70. The receptacle non-threaded portion 76 is an untapped (e.g., smooth, cylindrical) portion of the mount sidewall 66. The receptacle non-threaded portion 76 is disposed at the receptacle inner end 72.

The supply passage orifice 68 is disposed along an intermediate region of the injector receptacle 38. The supply passage orifice 68, for example, is located longitudinally (e.g., midway) between the receptacle outer end 70 and the receptacle inner end 72 along the longitudinal centerline 28. The supply passage orifice 68 of FIGS. 3 and 4, in particular, is disposed in the untapped portion of the mount sidewall 66—in the receptacle non-threaded portion 76. The fuel supply passage 62 is thereby fluidly coupled with the injector receptacle 38 and its non-threaded portion 76.

Figure 5:
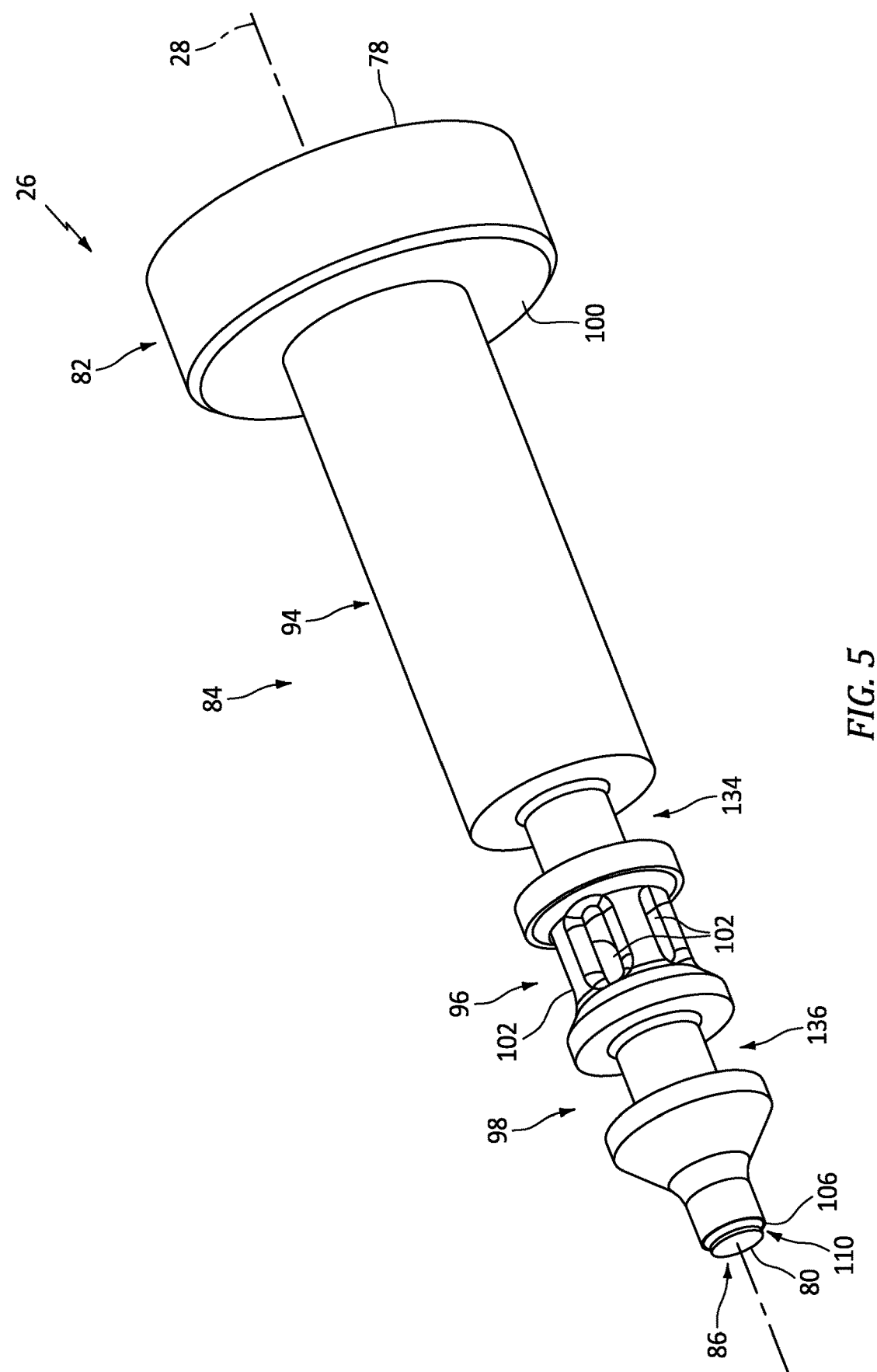
FIG. 5 is a perspective illustration of a fuel injector.
Figure 6:
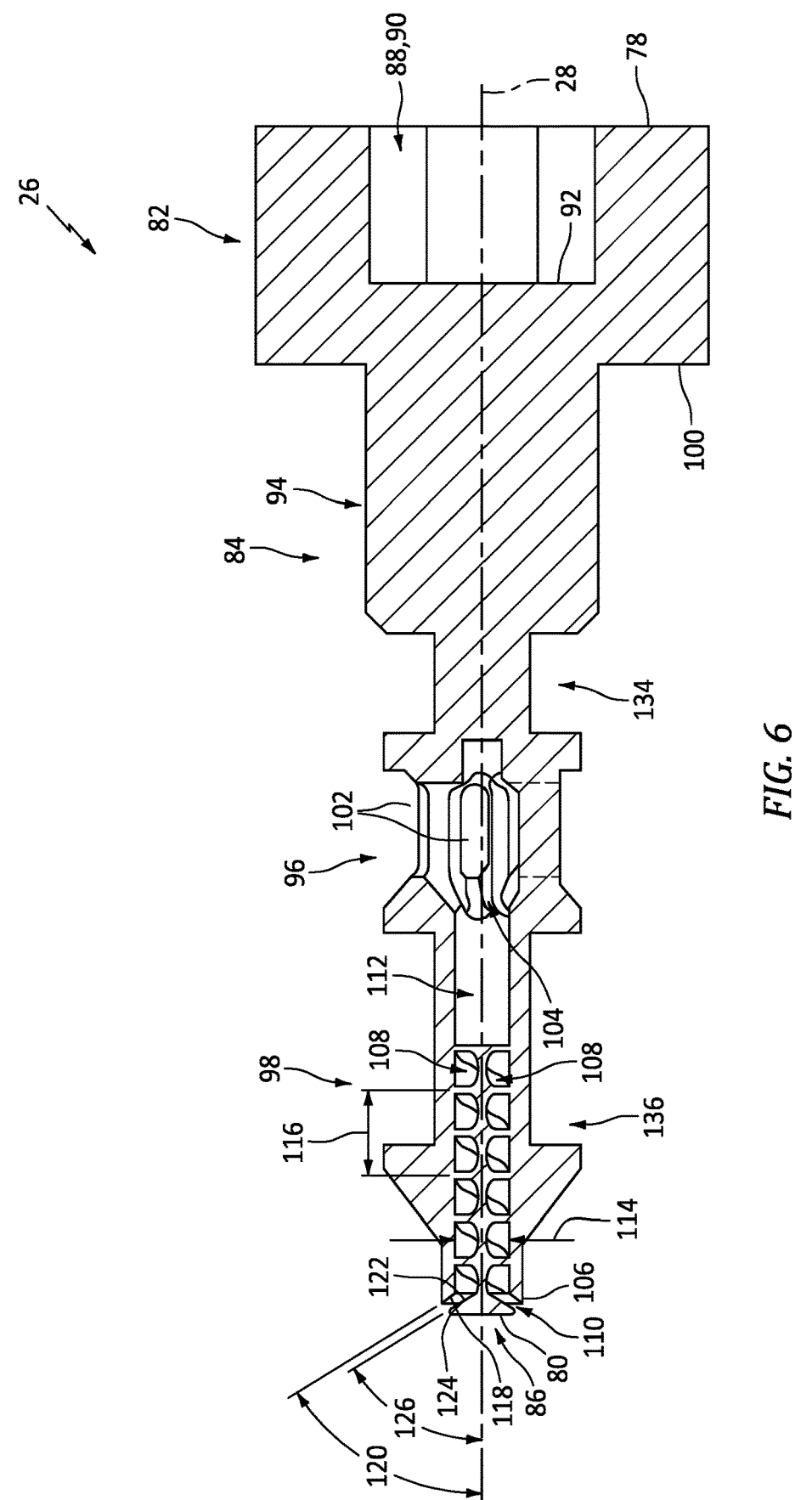
FIG. 6 is a sectional illustration of the fuel injector.

Referring to FIGS. 5 and 6, the fuel injector 26 may be configured as a fuel injector plug; e.g., a fuel injector bolt. The fuel injector 26 of FIG. 5, for example, extends longitudinally along the longitudinal centerline 28 between and to an outer end 78 of the fuel injector 26 and an inner end 80 of the fuel injector 26, which injector inner end 80 is longitudinally opposite the injector outer end 78. The fuel injector 26 of FIG. 5 includes a fuel injector head 82, a fuel injector base 84 and a splash plate 86, where the injector head 82 may be a head of the fuel injector plug and the injector base 84 may be a shank of the fuel injector plug.

Figures 7A, 7B, 8:
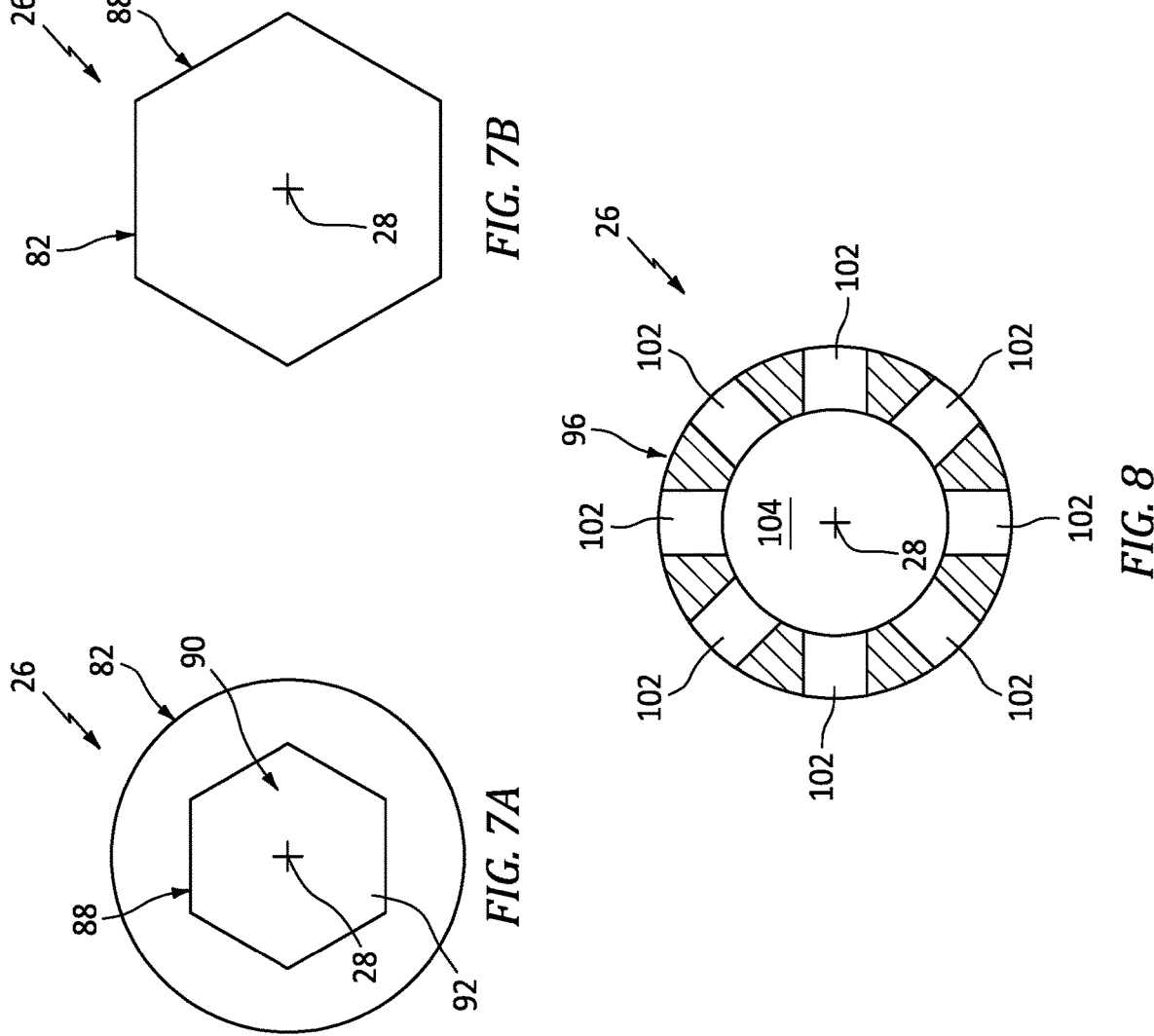
FIG. 7A is an illustration of a head of the fuel injector with an internal wrenching feature.
FIG. 7B is an illustration of the fuel injector head with an external wrenching feature.
FIG. 8 is a cross-sectional illustration of the fuel injector at its fuel coupler.

The injector head 82 is connected to the injector base 84 and arranged at the injector outer end 78. Referring to FIGS. 7A and 7B, the injector head 82 may be configured with a wrenching feature 88. The injector head 82 of FIGS. 6 and 7A, for example, is configured with a recess 90 for receiving and mating with a tool (not shown) such as, but not limited to, a hex-head tool (e.g., an Allen wrench or drive). The recess 90 projects longitudinally along the longitudinal centerline 28 partially into the injector head 82 from the injector outer end 78 to an inner distal end 92 of the wrenching feature 88. The recess 90 of FIG. 7A has a polygonal cross-sectional geometry such as a hexagonal cross-sectional geometry when viewed, for example, in a second reference plane perpendicular to the longitudinal centerline 28; e.g., plane of FIG. 7A. While the wrenching feature 88 is described above as an internal wrenching feature, the injector head 82 may also or alternatively be configured with an external wrenching feature. For example, referring to FIG. 7B, an exterior of the injector head 82 may be configured one or more flats (e.g., planer surfaces) to provide the head 80 with a polygonal cross-sectional geometry.

Referring to FIG. 5, the injector base 84 projects longitudinally along the longitudinal centerline 28 from the injector head 82 to the injector inner end 80. The injector base 84 of FIG. 5 includes a (e.g., threaded) fuel injector attachment 94, a fuel coupler 96 and a fuel nozzle 98.

The injector attachment 94 is longitudinally between and connected to (e.g., formed integral with or otherwise attached to) the injector head 82 and the fuel coupler 96. The injector attachment 94 of FIG. 5, for example, extends longitudinally along the longitudinal centerline 28 to and between the injector head 82 and the fuel coupler 96. The injector attachment 94 may be a solid portion of the fuel injector 26; see also FIG. 6. The injector attachment 94, for example, may be configured without any pathways through which fluid (e.g., fuel) may travel (e.g., laterally and/or longitudinally) thereacross. More particularly, the fuel injector 26 of FIG. 5 is configured without any apertures, bores, channels, etc. extending laterally and/or longitudinally through the injector attachment 94.

An exterior of the injector attachment 94 is configured with threads for mating with the receptacle threaded portion 74; see FIGS. 1 and 2. The threaded exterior of the injector attachment 94 may be laterally (e.g., radially relative to the longitudinal centerline 28) recessed from the exterior of the injector head 82 such that a (e.g., annular) head shoulder 100 extends laterally between the exteriors and circumferentially around the longitudinal centerline 28.

Referring to FIG. 6, the fuel coupler 96 is longitudinally between and connected to (e.g., formed integral with or otherwise attached to) the injector attachment 94 and the fuel nozzle 98. The fuel coupler 96 of FIG. 6, for example, extends longitudinally along the longitudinal centerline 28 to and between the injector attachment 94 and the fuel nozzle 98. The fuel coupler 96 is configured with a lateral width (e.g., a diameter) that is less than a lateral width (e.g., a diameter) of the injector attachment 94.

The fuel coupler 96 includes one or more ports 102 (e.g., apertures, windows, pass-throughs, etc.) and an internal chamber 104 (e.g., a plenum or another internal volume). Referring to FIG. 8, the ports 102 are arranged circumferentially about the longitudinal centerline 28. Each port 102 provides a flowpath from an exterior of the fuel coupler 96 into the internal chamber 104. Each port 102 of FIG. 8, for example, projects laterally (e.g., radially relative to the longitudinal centerline 28) into the fuel coupler 96 from the exterior of the fuel coupler 96 to the internal chamber 104. The internal chamber 104 is laterally and longitudinally within the fuel coupler 96. The internal chamber 104, for example, may be an internal bore within the fuel coupler 96.

Referring to FIG. 6, the fuel nozzle 98 is connected to the fuel coupler 96. The fuel nozzle 98 of FIG. 6, for example, projects longitudinally along the longitudinal centerline 28 from the fuel coupler 96 to a distal end 106 (e.g., a tip) of the fuel nozzle 98 proximate the injector inner end 80. The fuel nozzle 98 is configured with a lateral width (e.g., a diameter) that is different (e.g., less) than the lateral width of the fuel coupler 96 at the distal end 106; however, the present disclosure is not limited thereto.

The fuel nozzle 98 is configured with one or more spiral fuel nozzle passages 108 (e.g., parallel fuel passages) and a fuel nozzle outlet 110. The fuel nozzle 98 may also be configured with an internal bore 112. This internal bore 112 projects longitudinally along the longitudinal centerline 28 within the fuel nozzle 98 from the internal chamber 104 to the nozzle passages 108. The internal bore 112 may thereby fluidly couple the nozzle passages 108 to the internal chamber 104 in parallel. Each of the nozzle passages 108 spirals about the longitudinal centerline 28 within the fuel nozzle 98 towards the nozzle outlet 110. More particularly, each of the nozzle passages 108 spirals multiple revolutions about the longitudinal centerline 28 from the internal bore 112 (or alternatively directly from the internal chamber 104) to the nozzle outlet 110. The nozzle passages 108 of FIG. 6 longitudinally overlap one another along the longitudinal centerline 28. The nozzle passages 108 may thereby be arranged with a double helical geometry about and along the longitudinal centerline 28, where each nozzle passage 108 fluidly couples the internal bore 112 and, thus, the internal chamber 104 to the nozzle outlet 110 independent of the other nozzle passage 108. With this arrangement, the nozzle passages 108 form a fuel swirler within the fuel nozzle 98 at (e.g., just upstream of) the nozzle outlet 110.

Each nozzle passage 108 has an outer spiral diameter 114 and a spiral pitch 116. The spiral diameter 114 may be uniform (e.g., constant) longitudinally along the longitudinal centerline 28. The spiral pitch 116 may be equal to or greater than the spiral diameter 114. The present disclosure, however, is not limited to such an exemplary relationship. The spiral pitch 116, for example, may alternatively be less than the spiral diameter 114. The spiral pitch 116 may be sized larger than the spiral diameter 114 to increase longitudinal forward momentum of fuel flowing through the nozzle passages 108.

The nozzle outlet 110 is disposed at the nozzle distal end 106. This nozzle outlet 110 is configured as a port or an orifice which fluidly couples the nozzle passages 108 to an environment outside of the fuel injector 26 and its fuel nozzle 98; e.g., the combustion chamber 44 of FIGS. 1 and 2. The nozzle outlet 110 thereby provides an outlet from the nozzle passages 108 and, more generally, from the fuel injector 26 and its fuel nozzle 98. The nozzle outlet 110 may be configured with a divergent geometry. An outer periphery of the nozzle outlet 110 of FIG. 7, for example, is formed by an annular outer nozzle surface 118; e.g., a frustoconical nozzle surface. This nozzle surface 118 extends circumferentially about (e.g., completely around) the longitudinal centerline 28. A radius of the nozzle surface 118 increases as the nozzle surface 118 extends longitudinally along the longitudinal centerline 28 from the nozzle passages 108 towards the injector inner end 80. With this arrangement, the nozzle surface 118 is angularly offset from the longitudinal centerline 28 by an included angle 120 when viewed, for example, in the first reference plane; e.g., plane of FIG. 6. This nozzle surface angle 120 is a non-zero acute angle greater than twenty degrees (20°); e.g., between twenty degrees (20°) and forty degrees (40°), between forty degrees (40°) and sixty degrees (60°), between sixty degrees (60°) and eighty degrees (80°). The present disclosure, however, is not limited to such an exemplary relationship. The nozzle surface angle 120, for example, may alternatively be a right angle (90°) in other select embodiments.

The splash plate 86 is connected to (e.g., formed integral with or otherwise attached to) the fuel nozzle 98 at the injector inner end 80. The splash plate 86 has an annular splash plate surface 122 (e.g., a frustoconical splash plate surface) disposed longitudinally opposite the nozzle outlet 110. The splash plate surface 122 of FIG. 6, for example, is spaced longitudinally from the nozzle distal end 106 and the nozzle outlet 110 by a longitudinal distance. The splash plate surface 122 extends circumferentially about (e.g., completely around) the longitudinal centerline 28. The splash plate surface 122 projects radially out to a distal outer peripheral edge 124 (e.g., an outer rim) of the splash plate 86. A radius of the splash plate surface 122 increases as the splash plate 86 extends longitudinally along the longitudinal centerline 28 away from the nozzle outlet 110. With this arrangement, the splash plate surface 122 is angularly offset from the longitudinal centerline 28 by an included angle 126 when viewed, for example, in the first reference plane; e.g., plane of FIG. 6. This splash plate surface angle 126 may be equal to or less than the nozzle surface angle 120. The splash plate surface angle 126, for example, is a non-zero acute angle greater than twenty degrees (20°); e.g., between twenty degrees (20°) and forty degrees (40°), between forty degrees (40°) and sixty degrees (60°), between sixty degrees (60°) and eighty degrees (80°). The present disclosure, however, is not limited to such an exemplary relationship.

The radius of the splash plate surface 122 at the outer peripheral edge 124 of the splash plate 86 may be sized greater than a maximum radius of the nozzle outlet 110. The splash plate 86 and its splash plate surface 122 may thereby (e.g., completely) laterally overlap the nozzle outlet 110.

Referring to FIGS. 1 and 2, the fuel injector 26 is mated with (e.g., disposed and/or threaded into) the injector receptacle 38. For example, during assembly, the fuel nozzle 98 is inserted longitudinally into the injector receptacle 38 at the receptacle outer end 70 (see also FIGS. 3 and 4). The fuel nozzle 98 is moved longitudinally through the receptacle threaded portion 74 and into the receptacle non-threaded portion 76. The external threads of the injector attachment 94 are mated with the internal threads of the receptacle threaded portion 74. The fuel injector 26 is threaded (e.g., screwed) into the injector receptacle 38 using a tool (not shown) until, for example, the head shoulder 100 is longitudinally abutted and preloaded direct against a surface 128 at the mount distal end 56, or indirectly against the mount distal end surface 128 through a washer (not shown). The fuel injector 26 is thereby removably attached to the engine structure 22 by a threaded interface between the interior threads on the mount sidewall 66 of the receptacle threaded portion 74 and the exterior threads on the injector attachment 94.

In the assembled position of FIG. 1, the supply passage orifice 68 is aligned with the fuel coupler 96 and at least one of its ports 102. One of the ports 102, for example, may at least partially (or completely) longitudinally overlap and may at least partially (or completely) circumferentially overlap the supply passage orifice 68 to provide a (e.g., unobstructed, or only partially obstructed) fluid coupling between the fuel supply passage 62 and the internal chamber 104. Note, the ports 102 may be configured with the fuel coupler 96 (e.g., sized and spaced around the longitudinal centerline 28) such that, for example, at least one of these ports 102 is at least partially (or completely) aligned with the supply passage orifice 68 no matter how the fuel nozzle 98 is clocked about the longitudinal centerline 28 within the injector receptacle 38.

The injector attachment 94 and/or the fuel coupler 96 may be arranged completely within the injector receptacle 38. The fuel nozzle 98 may be arranged (e.g., partially or completely) within and/or outside of the injector receptacle 38. More particularly, the fuel nozzle 98 of FIGS. 1 and 2 projects longitudinally out from the injector receptacle 38, away from the inner wall inner surface 40 and into the combustion chamber 44.

With the above configuration, the fuel injector 26 may be installed with the engine structure 22 and removed from the engine structure 22 from an exterior of the engine structure 22. Assembly personnel, maintenance personnel and/or inspection personnel may thereby install, replace and/or service the fuel injector 26 without requiring disassembly and/or removal of the engine structure 22 nor access to an interior of the engine structure 22. Fuel injectors 26 with, for example, different fuel coupler configurations, fuel nozzle configurations, etc. may be more easily swapped. The plug-and-play operation of the fuel nozzle 98 reduces complexity of the fuel delivery system. For example, a single step of mating the fuel injector 26 with the engine structure 22 may (A) fluidly couple the fuel injector 26 with the fuel conduit 36 as well as (B) position the fuel nozzle 98 for operation. Furthermore, the bolt-like design of the fuel injector 26 may simplify the mechanical connection between the fuel injector 26 and the engine structure 22.

Figure 9:
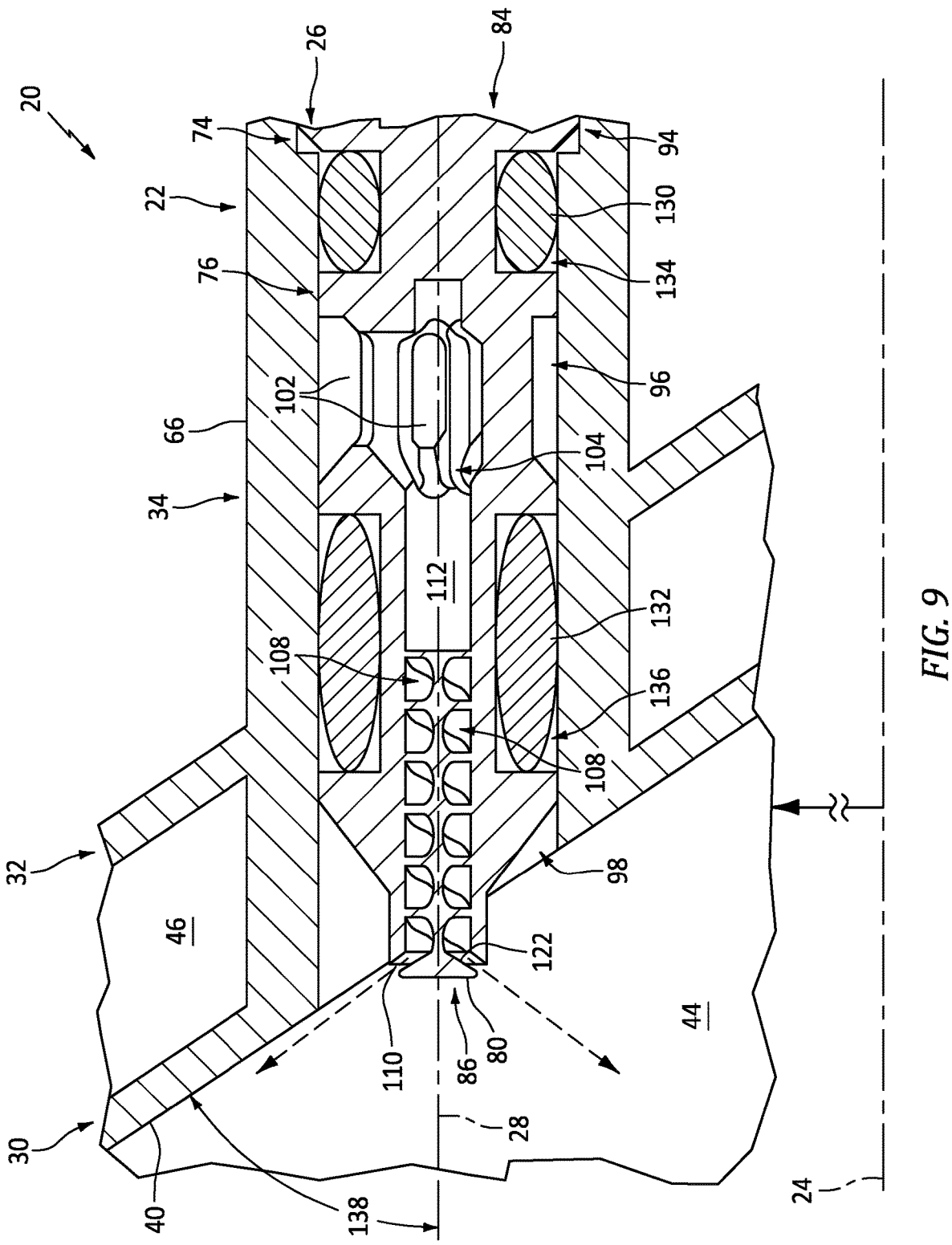
FIG. 9 is a sectional illustration of a portion of the engine assembly of FIG. 2 during engine operation.

Referring to FIG. 1, during engine operation, fuel is directed into the fuel supply passage 62 from a fuel source (not shown). At least a portion (or all) of the fuel within the fuel supply passage 62 is directed into the nozzle passages 108. Referring to FIG. 9, the fuel flowing within the fuel nozzle 98 is swirled by the nozzle passages 108 and directed out of the fuel nozzle 98 through the nozzle outlet 110 into a spatial gap between (a) the fuel nozzle 98 and its nozzle outlet 110 and (b) the splash plate 86 and its splash plate surface 122 as a swirler fuel jet. This swirled fuel jet flows through the spatial gap and impacts (e.g., impinges against) the splash plate surface 122. Upon impacting the splash plate surface 122, the splash plate 86 redirects (e.g., disperses) the impinging fuel jet radially outward (relative to the longitudinal centerline 28) into a (e.g., uniform and/or symmetrical) disperse radiant pattern; e.g., an arcuate and/or a generally planar film. The fuel may thereby be more evenly dispersed/spread/mixed into fluid (e.g., air, fuel-air mixture, combustion products, etc.) within the combustion chamber 44. Providing such relatively even mixing of the fuel and the fluid may in turn increase fuel burn efficiency and/or reduce likelihood of carbon formation within the engine.

In some embodiments, the fuel injector 26 may be configured with one or more annular seal elements 130 and 132. Each seal element 130, 132 may be configured as a ring seal such as, but not limited to, an O-ring element, a C-seal element, a crush seal element, a washer, etc. The ports 102 and the supply passage orifice 68 of FIG. 1 are positioned longitudinally along the longitudinal centerline 28 between the outer seal element 130 and the inner seal element 132.

The outer seal element 130 is seated in an annular outer seal receptacle 134 (e.g., a notch, a groove, a channel, etc.) in the injector base 84; see also FIGS. 5 and 6. The outer seal receptacle 134 of FIG. 1, in particular, is located in an outer portion of the fuel coupler 96. However, in other embodiments, the outer seal receptacle 134 may be located in an inner portion of the injector attachment 94, or in another portion of the fuel injector 26 and its injector base 84 longitudinally between the fuel coupler 96 and the injector attachment 94.

The outer seal element 130 is laterally engaged with the injector base 84 and the mount sidewall 66 in the receptacle non-threaded portion 76. The outer seal element 130 may thereby form a seal interface between the fuel injector 26 and the engine structure 22 such that the fuel, for example, does not leak (e.g., in an outward direction) between the engine assembly elements into an external environment.

The inner seal element 132 is seated in an annular inner seal receptacle 136 (e.g., a notch, a groove, a channel, etc.) in the injector base 84; see also FIGS. 5 and 6. The inner seal receptacle 136 of FIG. 1, in particular, is located in an inner portion of the fuel coupler 96. However, in other embodiments, the inner seal receptacle 136 may be located in an outer portion of the fuel nozzle 98, or in another portion of the fuel injector 26 and its injector base 84 longitudinally between the fuel coupler 96 and the fuel nozzle 98.

The inner seal element 132 is laterally engaged with the injector base 84 and the mount sidewall 66 in the receptacle non-threaded portion 76. The inner seal element 132 may thereby form a seal interface between the fuel injector 26 and the engine structure 22 such that the fuel, for example, does not leak (e.g., in an inward direction) between the engine assembly elements into the combustion chamber 44.

In some embodiments, referring to FIG. 9, the longitudinal centerline 28 may be arranged parallel with the centerline axis 24. In other embodiments, the longitudinal centerline 28 may be angularly offset from the centerline axis 24 by less than ten or fifteen degrees (10-15°). The present disclosure, however, is not limited to such exemplary arrangements.

The inner wall 30 and its inner wall inner surface 40 are angularly offset from the longitudinal centerline 28 by an included offset angle 138. Here, the first wall offset angle 138 is equal to the inner wall angle 48 (see FIG. 4); however, the present disclosure is not limited to such an exemplary relationship. In some embodiments, the splash plate surface angle 126 (see FIG. 6) may be equal to or less than the first wall offset angle 138. With this arrangement, the fuel may be directed into the combustion chamber 44 by the splash plate 86, for example, without also impinging against and/or being substantially obstructed by and/or redirected by the inner wall 30 and its inner wall inner surface 40.

Figure 10:
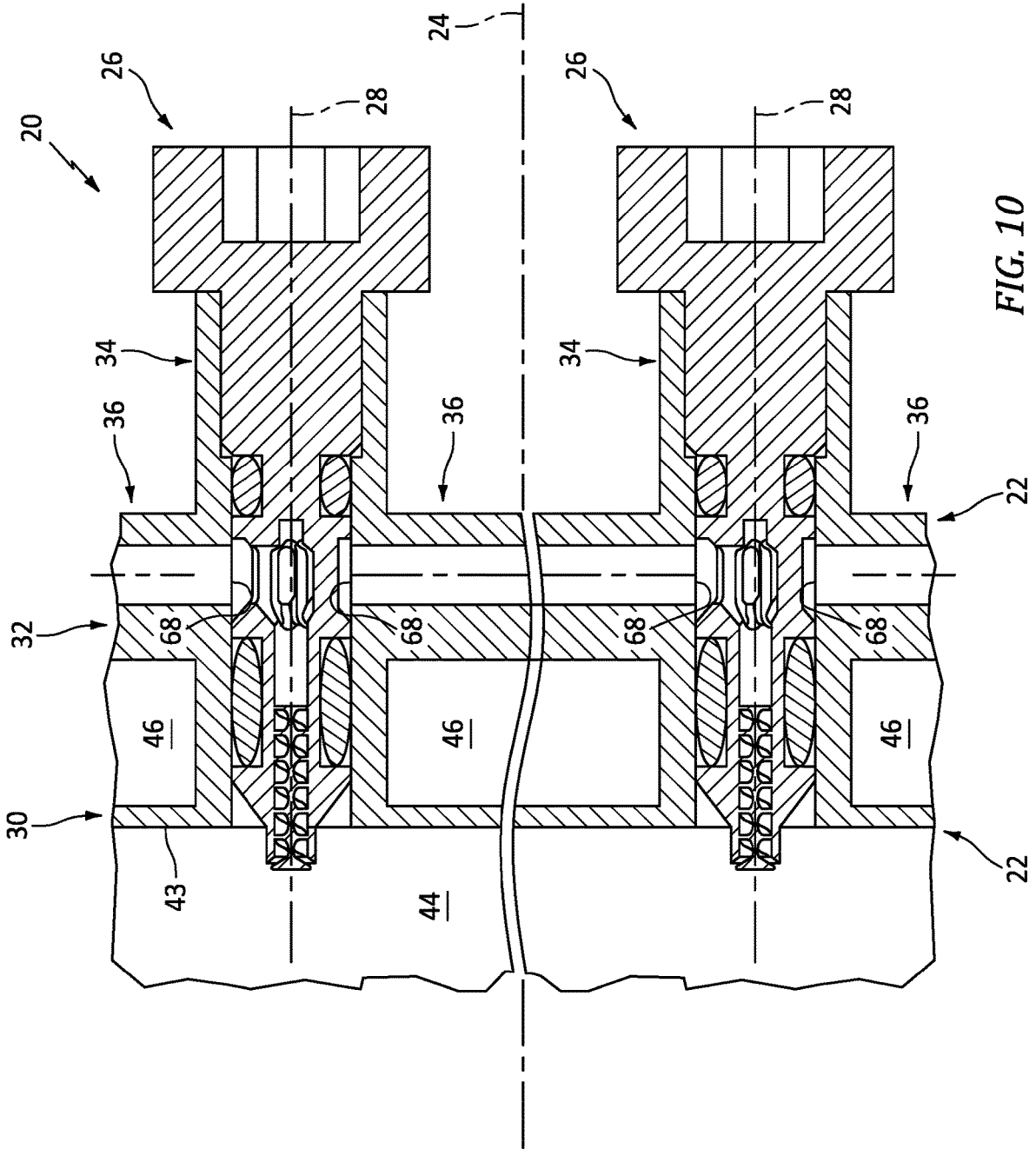
FIG. 10 is a plan view schematic illustration of another engine assembly configured with a plurality of the fuel injectors.

In some embodiments, referring to FIG. 10, the engine assembly 20 may include a plurality of the fuel injectors 26. These fuel injectors 26 may be arranged circumferentially about the centerline axis 24 in, for example, an annular array. Each of the fuel injectors 26 may be configured as described above. The engine structure 22 may also be generally configured as described above. However, the engine structure 22 may include a plurality of the fuel conduits 36 and a plurality of the injector mounts 34, where each injector mount 34 is configured to mount a respective one of the fuel injectors 26 with the engine structure 22.

The fuel conduits 36 may be configured to collectively form a fuel supply (e.g., a manifold) for the fuel injectors 26. Each fuel conduit 36 of FIG. 10, for example, is arranged between a respective circumferentially adjacent pair of the fuel injectors 26. Each injector mount 34 may be arranged circumferentially between and connected to respective circumferentially adjacent pair of the fuel conduits 36. Thus, each injector receptacle 38 (see FIGS. 1 and 2) and the respective fuel injector 26 received therein is fluidly coupled with a respective pair of the fuel supply passages 62.

In some embodiments, referring to FIGS. 1 and 2, each fuel injector 26 may be configured as a monolithic body. Each fuel injector 26 and its elements 82, 84 and 86, for example, may be additively manufactured, cast, machined and/or otherwise forms as a single integral, unitary body. The engine structure 22 may also or alternatively be configured as a monolithic body. The engine structure 22 of FIGS. 1-4 and 10, for example, and each of its elements 30, 32, 34 and 36 may be additively manufactured, cast, machined and/or otherwise formed as a single integral, unitary body. By contrast, a non-monolithic body may include parts that are discretely formed from one another, where those parts are subsequently mechanically fastened and/or otherwise attached to one another.

Figure 11:
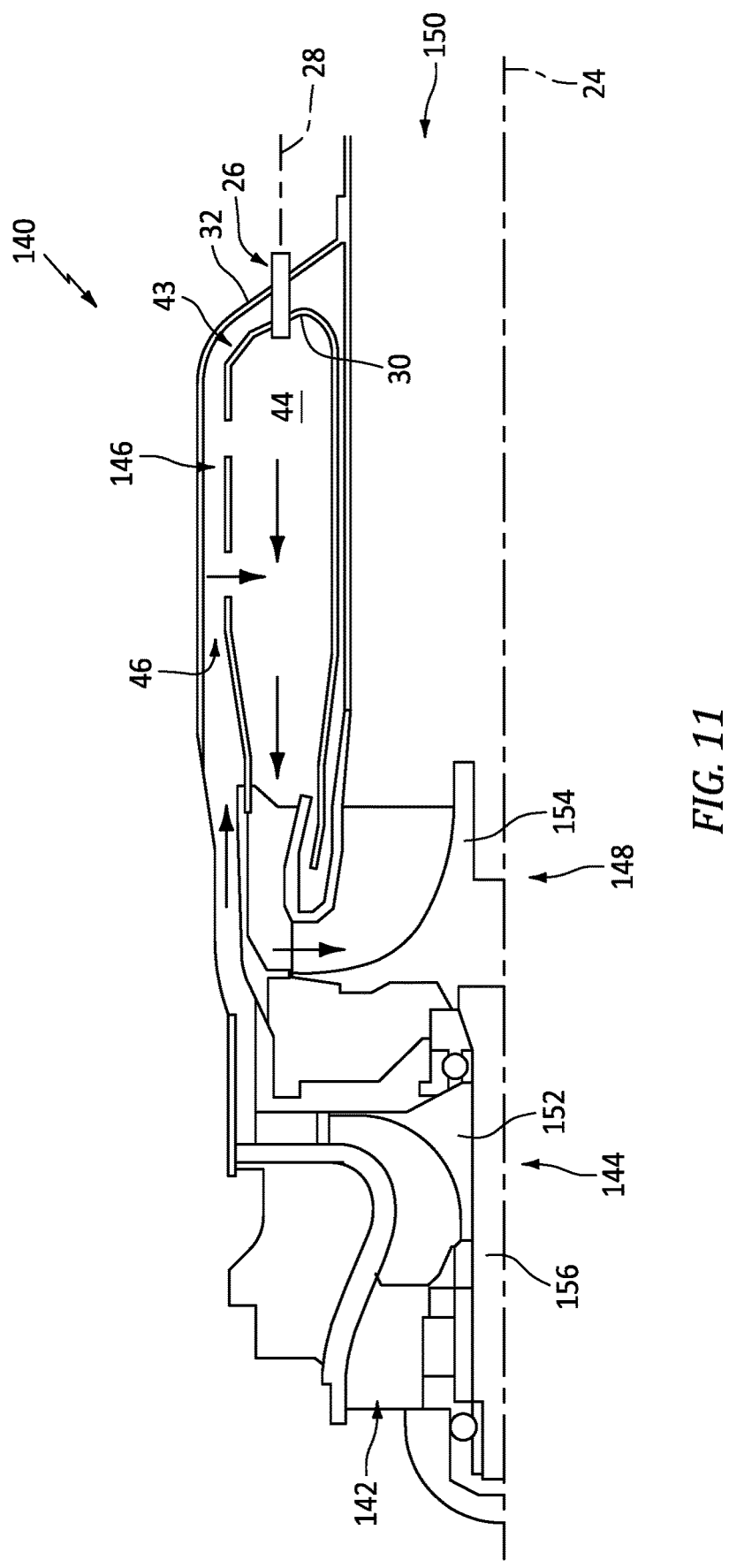
FIG. 11 is a schematic side illustration of a single spool, radial-flow turbojet turbine engine.

FIG. 11 schematically illustrates a single spool, radial-flow turbojet turbine engine 140 with which the engine assembly 20 of FIGS. 1, 2 and 10 may be included. This turbine engine 140 may be configured for propelling an unmanned aerial vehicle (UAV), a drone, or any other manned or unmanned aircraft or self-propelled projectile. In the specific embodiment of FIG. 11, the turbine engine 140 includes an upstream inlet 142, a (e.g., radial) compressor section 144, a combustor section 146, a (e.g., radial) turbine section 148 and a downstream exhaust 150 fluidly coupled in series. A compressor rotor 152 in the compressor section 146 is coupled with a turbine rotor 154 in the turbine section 148 by a shaft 156, which rotates about the centerline axis 24 of the turbine engine 140. Here, the engine combustor 43 is disposed within the combustor section 146.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. An assembly for an engine, comprising:
an engine structure including an injector receptacle and a fuel supply passage, the injector receptacle extending longitudinally through the engine structure along a centerline, and the fuel supply passage extending laterally within the engine structure to the injector receptacle; and
a fuel injector mated with the injector receptacle, the fuel injector including a fuel nozzle and a splash plate, the fuel nozzle including an internal bore, a nozzle passage, and a nozzle outlet, the internal bore projecting longitudinally along the centerline within the fuel nozzle to the nozzle passage, the nozzle passage spiraling about the centerline within the fuel injector from the internal bore to the nozzle outlet, the nozzle passage fluidly coupling the nozzle outlet to the fuel supply passage, the splash plate disposed at a distal end of the fuel nozzle and laterally overlapping the nozzle outlet, and the splash plate extending longitudinally along the centerline.

2. The assembly of claim 1, wherein the nozzle passage spirals two or more rotations about the centerline within the fuel injector.

3. The assembly of claim 1, wherein the nozzle passage has a spiral diameter and a spiral pitch that is equal to or greater than the spiral diameter.

4. The assembly of claim 1, wherein
the nozzle passage is a first nozzle passage, and the fuel injector further includes a second nozzle passage longitudinally overlapping the first nozzle passage;
the second nozzle passage spirals about the centerline within the fuel injector towards the nozzle outlet, and the second nozzle passage fluidly couples the nozzle outlet to the fuel supply passage.

5. The assembly of claim 1, wherein the fuel injector is configured to direct fuel, received by the nozzle passage from the fuel supply passage, out of the fuel nozzle through the nozzle outlet to impinge against the splash plate.

6. The assembly of claim 5, wherein
the splash plate comprises a frustoconical splash plate surface; and
the fuel injector is configured to direct fuel out of the fuel nozzle through the nozzle outlet to impinge against the frustoconical splash plate surface.

7. The assembly of claim 6, wherein
the injector receptacle extends longitudinally through the engine structure along the centerline to an interior surface of the engine structure, and the interior surface is angularly offset from the centerline by a first angle; and
the frustoconical splash plate surface is angularly offset from the centerline by a second angle that is equal to or less than the first angle.

8. The assembly of claim 6, wherein the nozzle outlet is formed by a frustoconical nozzle surface that is longitudinally spaced from and parallel with the frustoconical splash plate surface.

9. The assembly of claim 1, wherein
the fuel injector further includes a fuel coupler disposed within the fuel injector receptacle adjacent the fuel supply passage; and
the fuel coupler fluidly couples the fuel supply passage to the nozzle passage.

10. The assembly of claim 9, wherein
the fuel coupler includes a tubular sidewall and a chamber within the tubular sidewall;
a port extends laterally through the tubular sidewall, and the port is at least partially aligned with an orifice to the fuel supply passage; and
the chamber is fluidly coupled with and between the port and the nozzle passage.

11. The assembly of claim 1, wherein the fuel injector is attached to the engine structure by a threaded interface.

12. The assembly of claim 1, wherein
the fuel injector includes a base and a head connected to the base;
the base projects longitudinally along the centerline into the injector receptacle; and
the head is abutted longitudinally against a surface of the engine structure.

13. The assembly of claim 1, wherein
the engine comprises a gas turbine engine; and
the engine structure comprises a wall of a combustor of the gas turbine engine.

14. The assembly of claim 13, wherein the centerline is parallel with or angularly offset from a centerline axis of the combustor by less than fifteen degrees.

15. The assembly of claim 1, wherein the splash plate is formed integral with the fuel nozzle.

16. An assembly for an engine, comprising:
an engine structure including an injector receptacle and a fuel supply passage, the injector receptacle extending longitudinally through the engine structure along a centerline, and the fuel supply passage extending laterally within the engine structure to the injector receptacle; and
a fuel injector mated with the injector receptacle and attached to the engine structure by a threaded interface, the fuel injector configured as a monolithic body and including a fuel nozzle and a splash plate, the fuel nozzle including an internal bore, a nozzle passage, and an annular nozzle outlet, the splash plate comprising a frustoconical splash plate surface extending longitudinally along the centerline and circumferentially overlapping the annular nozzle outlet, and the fuel injector configured to direct fuel, received by the nozzle passage from the fuel supply passage, out of the fuel nozzle to impinge against the frustoconical splash plate surface;
wherein the internal bore projects longitudinally along the centerline within the fuel nozzle to the nozzle passage, and the nozzle passage spirals about the centerline within the fuel injector from the internal bore to the nozzle outlet.

17. The assembly of claim 16, wherein the fuel nozzle includes a plurality of spiral nozzle passages, the plurality of spiral nozzle passages fluidly coupled in parallel between the annular nozzle outlet and the fuel supply passage.

18. An assembly for an engine, comprising:
an engine structure including an injector receptacle, a fuel supply passage and a combustion chamber, the injector receptacle extending longitudinally through the engine structure along a longitudinal centerline to the combustion chamber, the fuel supply passage extending laterally within the engine structure to the injector receptacle, and the longitudinal centerline parallel with or angularly offset from a centerline axis of the engine structure by less than fifteen degrees; and
a fuel injector mated with the injector receptacle and attached to the engine structure by a threaded interface, the fuel injector including a fuel nozzle and a splash plate, the fuel nozzle including an internal bore, a nozzle passage, and a nozzle outlet, the internal bore projecting longitudinally along the centerline within the fuel nozzle to the nozzle passage, the nozzle passage comprising a spiral nozzle passage, the nozzle passage extending longitudinally along the centerline within the fuel injector from the internal bore to the nozzle outlet, the nozzle passage fluidly coupling the nozzle outlet to the fuel supply passage, the splash plate integral with the fuel nozzle, and the splash plate extending longitudinally along the centerline, and the splash pate extending laterally within the nozzle outlet.

* * * * *